Jan. 28, 1969   J. T. COLLINS   3,423,991

ULTRASONIC INSPECTION OF PLYWOOD PANEL

Filed May 21, 1965 Sheet 1 of 2

Jack T. Collins.
INVENTOR.

BY

ATTORNEY.

Jan. 28, 1969     J. T. COLLINS     3,423,991
ULTRASONIC INSPECTION OF PLYWOOD PANEL
Filed May 21, 1965
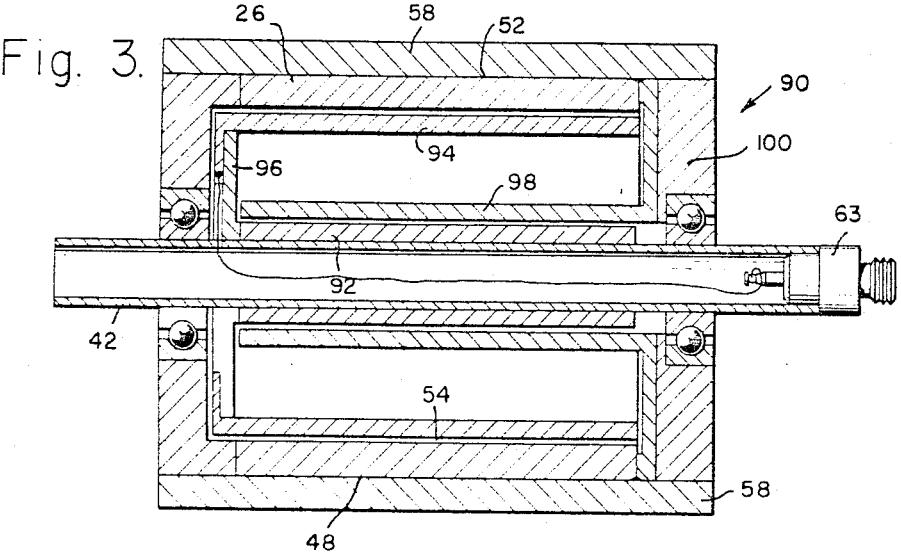
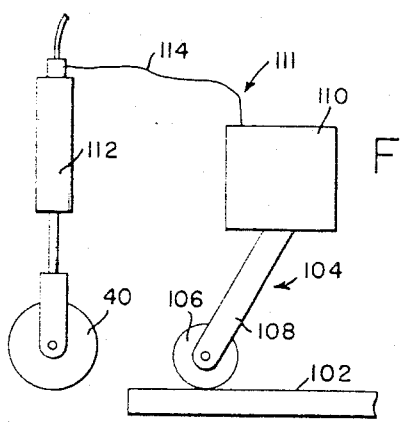
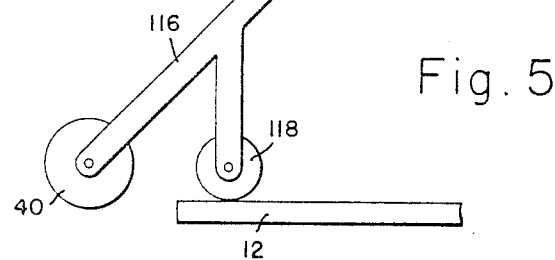
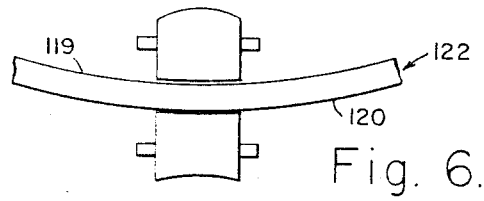
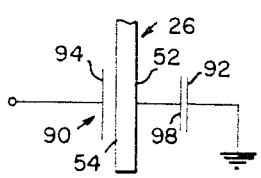
Jack T. Collins,
INVENTOR.
BY
ATTORNEY

United States Patent Office 3,423,991
Patented Jan. 28, 1969

3,423,991
ULTRASONIC INSPECTION OF
PLYWOOD PANEL
Jack T. Collins, Boulder, Colo., assignor to Automation Industries, Inc., El Segundo, Calif., a corporation of California
Filed May 21, 1965, Ser. No. 457,600
U.S. Cl. 73—67.5                                   11 Claims
Int. Cl. G01m 9/24

ABSTRACT OF THE DISCLOSURE

An ultrasonic inspection apparatus is disclosed herein for identifying those areas in plywood panels where the laminations are not properly bonded together. The inspection apparatus is adapted to be incorporated into a grade line for individually inspecting each panel at the same rate as the panels are being produced. This is accomplished by transmitting ultrasonic energy into one side of the panel and receiving the energy on the opposite side. A rugged search unit having a cylindrical transducer is provided for rolling along a surface of the panel for transmitting the ultrasonic energy into the panel and/or for receiving the ultrasonic energy that has propagated through the panel.

---

Figure 1:
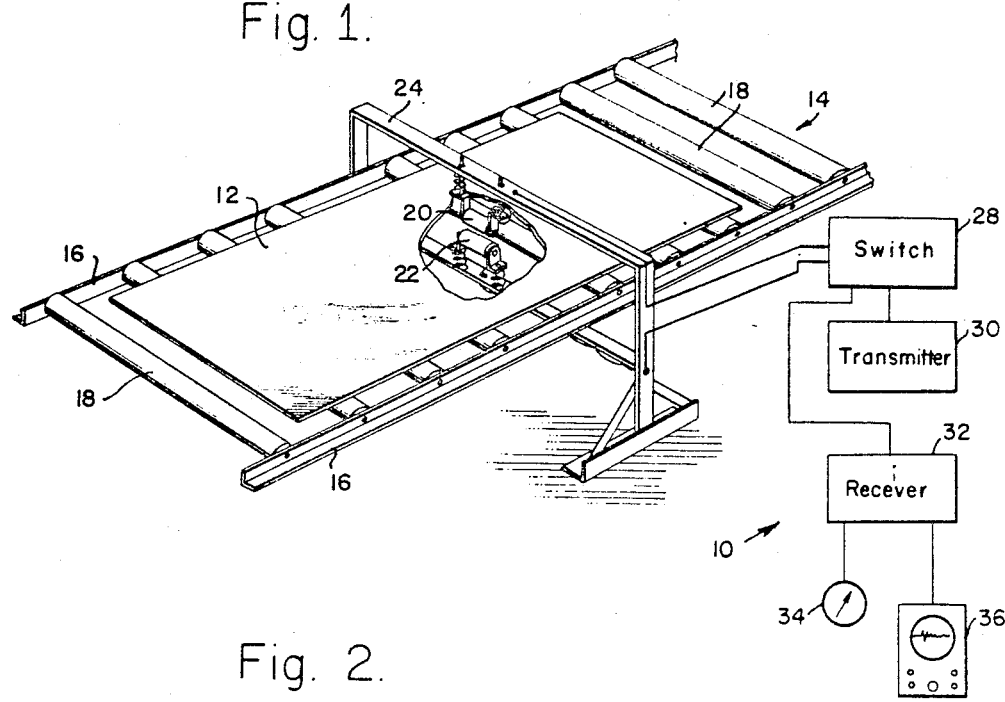

At the present time, there are a wide variety of nondestructive testing systems capable of inspecting materials or workpieces for hidden internal defects. One system which has been widely employed is the so-called ultrasonic type wherein high frequency or ultrasonic energy is coupled into the workpiece. Ultrasonic energy is similar to audible sound in that it includes mechanical vibrations but the frequency is in a range above the response level of the human ear, for example, in a region such as about 20 kc. up to about 25 mc. or even higher. In an acoustically homogeneous member the energy will travel at a velocity determined by the properties of the material. However, if the energy strikes an acoustical discontinuity such as a void produced by a crack, the back surface of the workpiece, etc., a substantial amount of the energy will be reflected from the discontinuity.

In one form of ultrasonic testing (so-called pulse-echo) the ultrasonic energy is coupled into the test piece and the amount and timing of the energy reflected back from the interior of the workpiece is measured. In another form of ultrasonic testing (so-called through-transmission), the ultrasonic energy is coupled into the workpiece and the energy transmitted completely therethrough. The amount and timing of the energy actually traveling completely through the workpiece is then measured.

Normally, the ultrasonic energy is generated and/or received by a search unit having a transducer employing a device such as a piezoelectric crystal. In one form of transducer, the search unit is hand held and is manually manipulated across the surface of the workpiece. This is, of course, a slow and tedious process and is not suitable for high speed automatic production. In order to permit the test system to operate at a high speed and automatically, the transducer must be coupled to the workpiece so as to permit high speed movement between the workpiece and transducer. One means of accomplishing this is to space the search unit or the transducer therein from the workpiece so that there is no frictional contact. Since air is a very poor carrier of ultrasonic energy, it is customary to employ a coupling liquid such as water or oil. This provides a liquid space between the search unit and the workpiece so that high speed relative motion can occur.

In another form of search unit, a wheel is provided for rolling across the surface of the workpiece. The transducer is mounted inside of the wheel and the wheel is filled with a coupling liquid. The transducer is focused on the "flat" between the rolling surface of the wheel and the surface of the workpiece. It can be seen that this will also provide high speed-low friction coupling into and out of the workpiece.

Although the foregoing types of search units are very effective, they have many disadvantages and limitations which make their use unsatisfactory for other types of applications. For example, some types of workpieces cannot be immersed in a coupling liquid or even have such a liquid flow across their surface as they will be severely damaged by the liquid. Also, if the liquid is flowed across the surface, the volume of liquid can be prohibitively large for some applications. The liquid filled wheel eliminates the necessity for the liquid contacting the workpiece. However, normally the wheel cannot be rotated at high rates of speed. In addition, it is difficult to start and stop the wheel at high rates of speed such as is necessary when inspecting workpieces which are disconnected and traveling along a production line at a high rate of speed. In addition, it is possible for excessive amounts of turbulence to occur in the coupling liquid as a result of the wheel rotating at high speeds and/or starting and stopping rapidly. Also, small particles and small air bubbles may be entrained in the liquid. The foregoing factors may interfere with the satisfactory operation of the search unit.

The present invention provides means for overcoming the foregoing difficulties and limitations. More particularly, the present invention provides a search unit wherein the transducer is acoustically coupled to the workpiece without the use of a coupling liquid. However, the search unit couples the transducer to the workpiece with a high efficiency and with very little, if any, friction, wear, etc. This, in turn, facilitates the search unit scanning the surface of the workpiece at a high rate of speed. This is accomplished by providing a search unit employing a wheel having a wear receiving surface for rolling across the surface of the workpiece and scanning a wide band of areas on the workpiece. Moreover, the wheel is a solid structure which can rotate at a high rate of speed and can be very rapidly stopped and started.

In the limited number of embodiments of the invention disclosed herein, an ultrasonic tester is provided which employs at least one search unit having a substantially cylindrical ultrasonic transducer therein with a substantially cylindrical active surface for transmitting and/or receiving ultrasonic energy. A wear receiving member is provided around the active surface for rolling across the surface of the workpiece and acoustically coupling the transducer to the workpiece. The wear receiving member may be resilient whereby it will be compressed against the active surface and form an elongated "flat." Thus, although the active surface is capable of transmitting or receiving ultrasonic energy in all radial directions, that portion of the active surface in direct line with the workpiece will be coupled directly thereto. Moreover, if the outer member is resilient it may roll over rough and irregular surfaces and still maintain the transducer continuously coupled thereto.

In addition, coupling means such as a pair of transformer windings or a pair of capacitive electrodes are provided in the search unit. One of the windings or electrodes is mounted on the cylindrical transducer and rotates therewith. This winding or electrode is coupled directly to the transducer and is effective to apply electrical signals to the transducer so as to cause it to radiate ultrasonic energy, or conversely is effective to recover signals from the transducer produced by ultrasonic energy incident thereon. The second transformer winding or electrode remains in a fixed or stationary position immediately adjacent to the rotating winding or electrode. As a result, the rotating and stationary portions of the search unit are coupled together whereby signals can be transferred therebetween without the necessity of employing any commutating rings or other devices which tend to produce noise that interferes with the signals.

Figure 2:
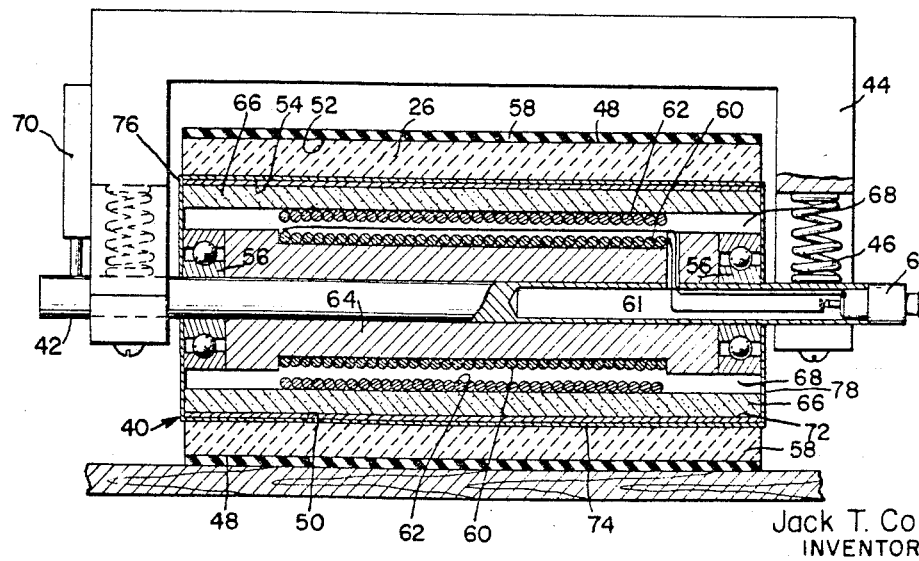

These and other features and advantages of the present invention will become readily apparent from the following detailed description of a single embodiment thereof, particularly when taken in connection with the accompanying drawings wherein:

FIGURE 1 is a combination perspective and diagrammatic view of an ultrasonic test system embodying one form of the present invention, FIGURE 2 is a cross-sectional view of a portion of the search unit employed in the system of FIGURE 1, FIGURE 3 is a cross-sectional view similar to FIGURE 2 of a search unit embodying another form of the present invention, FIGURE 4 is a side view of a portion of a test system embodying one form of mounting means for carrying the search unit, FIGURE 5 is a side view similar to FIGURE 4 but showing a still further form of search unit mounting, FIGURE 6 is a fragmentary cross-sectional view of another embodiment of the test system for inspecting a particular form of workpiece, and FIGURE 7 is a schematic diagram of the electrical circuit employed in the search unit of FIGURE 3.

Referring to the drawings in more detail, the present invention is particularly adapted to be embodied in an ultrasonic system 10 for inspecting workpieces for internal defects. The system 10 may be utilized for testing a wide variety of different types of workpieces. Although it may be embodied in a hand held unit for manually inspecting workpieces, it is especially useful on a production line or similar installation where it is desirable to inspect a long continuous workpiece or a large number of workpieces at a high rate of speed.

More particularly, for purposes of illustration, the present system 10 is particularly adapted to be employed with a production process wherein flat thin members such as plywood panels 12 are being produced. The test system 10 will inspect each of the plywood panels 12 for internal defects. Although a wide variety of defects may occur in a plywood panel, the most common is a lack of bonding between the various laminations within the panel 12.

The plywood panels 12 are normally produced by bonding a plurality of separate or individual laminations together to form a solid structure. The strength of the panel is, of course, dependent upon all of the laminations being adequately bonded together. In the event one or more laminations are not bonded, there will be a void or air space between the laminations. A panel possessing such a defect may be graded as to quality or rejected if the defect is too large.

The fully bonded and finished panels may be transported by a conventional carrier or conveyor 14 to an area for further processing such as stacking, etc.

In the present instance, the conveyor 14 includes a pair of side rails 16 and a plurality of rollers 18 that extend between the side rails 16 so as to define a surface upon which the panel 12 may lay. The rollers 18 may be power driven or free running, so that the panels 12 can be carried along the conveyor 14 at a high rate of speed. It should be noted that although the panels 12 upon the conveyor 14 may be closely spaced, they normally travel at high rates of speed and are frequently separated by extended open spaces between the successive panels 12.

The present system 10 employs two separate search units 20 and 22 that are substantially identical to each other. However, it should be understood that it is possible to employ only a single search unit 20 or 22 if it is to operate in a pulse-echo mode. Each of the search units are mounted on a support 24 so as to be positioned immediately adjacent the plywood panel 12. Thus, each of the search units will roll along one side of the panel 12 as it travels along the conveyor 14.

Each of the search units 20 and 22 includes an ultrasonic transducer 26 that is electrically interconnected with a switch 28. This switch 28 may be of any desired variety, such as a mechanical or electronic switch. The switch 28 is, in turn, coupled to a transmitter 30 and a receiver 32. The receiver 32, in turn, is interconnected with a suitable readout means such as a meter 34 and/or an oscilloscope 36, etc.

If it is desired to employ the present tester 10 in a through-transmission mode, the switch 28 is set so that the transmitter 30 is coupled to one of the search units 20 or 22 while the receiver 32 is coupled to the other search unit 20 or 22. The transmitter 30 will then energize its associated search unit whereby high frequency ultrasonic energy is radiated from the search unit. Normally, this energy will be in a frequency range above the audible range and may be as high as 25 megacycles per second or even higher. Moreover, the energy may be radiated in the form of a series of short pulses of a few microseconds duration and with a repetition rate of a few kilocycles per second. However, if it is so desired, the ultrasonic energy can be transmitted continuously without any form of interruption.

When a panel 12 is traveling between the search units 20 and 22, the ultrasonic energy will be transmitted from the search unit into the panel 12 so as to propagate therethrough. If the panel 12 is substantially acoustically continuous, the energy will travel through the panel 12 with at least a portion thereof being radiated from the opposite side thereof. However, if there is an improperly bonded lamination with a corresponding air space, the ultrasonic energy will be greatly attenuated by the air space.

The second search unit is disposed on the opposite side of the panel 12 in substantial alignment with the first search unit. As a consequence, at least a portion of the energy radiated from the second side of the panel 12 will be coupled into the second search unit. The search unit will then produce an electrical signal having characteristics corresponding to the energy which is transmitted by the first search unit. In addition, the electrical signal will have an amplitude that is a function of the internal integrity of the panel 12, and a time that is a function of the thickness of the panel 12.

The electrical signal is coupled from the search unit through the switch 28 and into the receiver 32. The receiver 32 will then process the electrical signal and supply a signal to a readout means. The readout means may include an indicating meter 34, a cathode ray oscilloscope 36, and automatic reject mechanism, etc. The meter 34 may indicate the thickness of the panel, its internal integrity, etc. For example, the meter may be calibrated in terms of the percentage of bonding so as to indicate whether or not the bonding of the panel 12 is of an acceptable quality to meet the required production tolerances. The oscilloscope 36 at the same time, or alternatively, may provide an oscillogram indicating the characteristics of the signal and the internal integrity of the panel, its thickness, etc. The reject mechanism, or a similar apparatus, may be employed so as to respond to the signals and reject defective panels or to modify the production process to correct for defects.

If it is desired to operate the system 10 in a reflecting or pulse-echo mode, the switch 28 may be set so as to couple the transmitter 30 and receiver 32 to the same search unit. The transmitter 30 will then cause the search unit to transmit short pulses of ultrasonic energy into the panel 12. This energy will then be reflected from any acoustical discontinuities in the panel such as the back side of the panel 12 and/or any internal defects such as an air space resulting from a lack of bonding between laminations. The reflected energy will be received by the same search unit whereby a corresponding electrical signal will be produced. This signal will then be coupled through the switch 28 and into the receiver 32. The receiver 32 will actuate the meter 34, oscillograph 36 and/or reject mechanism, etc. The intensity and the time of the signal will indicate the distance from the surface to the reflecting discontinuity, i.e., lack of bond and/or the thickness between the front and back sides of the panel 12.

In the present embodiment, each of the search units employ a drum or roller 40. The roller 40, including an ultrasonic transducer, means for ultrasonic coupling to a workpiece and electrical coupling and shielding means, is mounted on a stationary (i.e., nonrotating) spindle or shaft 42. The shaft or spindle 42 is mounted in a bracket 44 secured to the supports 24. Although the spindle 42 does not rotate it has been found desirable to provide springs 46 in the bracket 44 for resiliently retaining the spindle 42 in position. This will permit the search unit to move normal to the workpiece, but will spring bias the search unit into position and maintain the drum 40 in intimate acoustical relationship with the panel 12, even though there are variations in the panel 12.

The ultrasonic transducer 26 is mounted in the drum 40. Transducer 26 may be of any desired variety but it is normally a device such as a piezoelectric crystal. Such a crystal has at least one active surface 48. When an appropriate electrical signal is applied to the transducer 26, it will mechanically vibrate and cause ultrasonic energy to be radiated from the active surface 48. Conversely, when ultrasonic energy is incident upon the active surface 48 and causes mechanical vibrations thereof, the transducer 26 will produce a corresponding electrical signal.

The present transducer 26 is rotatably mounted upon the spindle 42 and forms an integral part of the drum 40. The transducer 26 is a substantially cylindrical member having a passage extending axially therethrough. The transducer 26 will thus have substantially cylindrical outer and inner surfaces 48 and 50.

Suitable electrodes 52 and 54 may be applied to the opposite sides of the tranducer 26 for applying electrical signals to the transducer 26. When an electrical signal is applied to these electrodes 52 and 54, the transducer 26 will mechanically vibrate and radiate ultrasonic energy outwardly from the entire active suurface 48 formed on the outside of the transducer 26. Conversely, when ultrasonic energy is incident upon the active outer surface 48, a corresponding electrical signal will develop between the two electrodes 52 and 54.

The opposite ends of the drum 40 are supported by a pair of bearings 56 mounted on the opposite ends of the spindle 42. These bearings are effective to allow the transducer 26 to rotate about the spindle 42.

Means may be provided on the transducer 26 for coupling it to the workpiece. In the present instance, this is accomplished by providing a wear receiving member 58 that resembles a tire. The tire member 58 may be permanently mounted on the outside of the transducer 26 such as by bonding it directly to the active surface 48. The tire member 58 is preferably made from a resilient material that is transparent to ultrasonic energy. For example, materials such as rubber, adaprene, etc. may be employed. It is highly desirable that the acoustical characteristics such as the impedance of the member 58 and the bonding of the member 58 to the transducer 26 be very closely matched to the corresponding characteristics of the transducer 26. This will assist in obtaining a maximum transfer of energy from the transducer 26 and through the tire member 58.

The exterior of the tire member 58 forms a wear receiving surface adapted to roll along the surface of the workpiece 12. As previously stated, it is desirable of the tire member 58 to be somewhat resilient. This will permit the wear receiving surface of the tire member 58 to deform slightly whereby it will conform to irregularities in the surface of the panel. This, in turn, will eliminate or greatly reduce any air space that might otherwise occur on a rough or irregular surface and cause a mismatch between the transducer 26 and workpiece 12 with a resulting loss of energy.

The electrodes 52 and 54 on the transducer 26 may be coupled to the switch 28 by any suitable means. For example, a pair of commutators and slip rings may be provided. However, it has been found that such arrangements tend to wear and frequently produce a certain amount of noise that tends to interfere with some types of ultrasonic testing. In order to eliminate such difficulties, in the present instance, a pair of transformer windings 60 and 62 are employed for coupling the electrodes 52 and 54 to the switch 28. One of these windings 60 is mounted directly on the spindle 42. As a result, this winding 60 is always maintained in a fixed position. Accordingly, the winding 60 may be connected directly to the switch without any form of sliding contacts. More particularly, the winding 60 is coupled to a coaxial transmission line 61 in the shaft 42 and a coupling fastener 63 on the end of the shaft 42.

The other winding 62 is mounted on the transducer 26 so as to rotate therewith. Since this winding 62 rotates with the transducer 26, the opposite ends thereof may be connected directly to the electrodes 52 and 54 without any form of sliding or slipping contacts. The outer winding 62 is placed coaxial with the inner winding 60 and is always substantially uniformly spaced therefrom. Accordingly, the two windings 60 and 62 are inductively coupled together and will function as a transformer.

The two windings 60 and 62 may be encased in a core form such as a plastic "potting" material. However, in order to increase the degree of coupling between the two windings 60 and 62, core members 64 and 66 may be provided that include an inductive or magnetic material such as a high frequency ferrite, etc. The first core member 64 is mounted on the spindle 42 in a fixed position and has the outer surface recessed to receive the winding 60. The second core member 66 is attached to the inside of the transducer 26 and rotates therewith. This member 66 is also recessed to receive the second winding 62.

The interior of the second member 66 and the exterior of the first member 64 are very close to each other; however, they are separated by a small clearance space or air gap 68. This will permit the second core member 66 to rotate freely around the first core member 64. However, in spite of the air gap 68 the two core members 64 and 66 and, therefore, the coils 60 and 62 thereon will be inductively coupled to each other. As a result, even though the transducer 26 may be rotating, signals may be coupled into and out of the transducer 26 without being subjected to any sliding or moving contacts which might otherwise produce noise.

In order to utilize the present invention, the system 10 may be turned "ON" and the workpieces such as the panels 12 may be fed along the conveyor 14. This will cause the successive panels 12 to pass between the two search units 20 and 22 whereby the tire members 58 will roll along a band extending the length of the panel 12. When the system 10 is operating in a through transmission mode, the switch 28 will couple the transmitter 30 to one search unit and the receiver 32 to the other search unit.

The transmitter will energize one of the search units, for example, the first search unit 20. This is accomplished by supplying an electrical signal to the inner winding 60. When the electrical signal circulates through the inner winding 60, it will induce a corresponding signal in the second winding 62. Since the winding 62 is coupled directly to the electrodes 52 and 54, the transducer 26 will radiate ultrasonic energy from the entire active surface 48.

It is to be noted that this energy will propagate radially outwardly through all portions of the tire member 58. However, only that portion of the energy in the region of the "flat" formed between the tire member 58 and the surface of the workpiece 12 will be coupled through the tire member 58 and into the workpiece or panel 12. This energy will normally travel completely through the panel 12 to the surface on the opposite side thereof.

The portion of the energy incident on the "flat" formed on the tire member 58 as it contacts the surface of the panel 12 will be coupled through the "flat" and into the tire member 58 in search unit 22. The energy will then strike a corresponding portion of the active surface 48 of the transducer 26. This, in turn, will cause a corresponding electrical signal to be developed between the electrodes 52 and 54 and circulated through the rotating winding 62.

The signal in the rotating winding 62 will then be coupled into the stationary winding 60 and flow directly to the switch 28 and thence to the receiver 32. If the panel 12 is properly constructed, i.e., all of the various laminations are intimately bonded together, there will be a high degree of efficiency with which the energy is transmitted through the panel 12. Accordingly, the electrical signal produced in the receiving search unit 22 will have a maximum amplitude. It may be appreciated that if the thickness of the panel changes or it is warped, the springs 46 will accommodate a certain amount of motion of the drum. Also, if there are irregularities in the surface such as a raised grain, etc. the surface of the resilient tire member will always remain in contact with the surface of the panel. Thus, a high degree of acoustical coupling will always be maintained.

If there is a delamination or improper bonding between one or more of the laminations, there will be a gap or air space. This will reflect a large amount of the ultrasonic energy and/or greatly attenuate any of the higher frequency ultrasonic energy that traverse the air space. As a consequence, the intensity of the energy incident on the receiving transducer 26 will be greatly decreased whenever a delamination is aligned with the search units 20 and 22. This, in turn, will provide a corresponding indication on the meter 34 and/or oscilloscope 36 so that the operator will readily observe the latent defect. In addition, or alternatively, means may be provided for rejecting the defective panel and/or for modifying the production process so as to eliminate further defects.

When there is no panel between the search units, the air space will greatly attenuate the ultrasonic energy and little or no energy will reach the other search unit. This, in turn, would appear as a defective panel. In order to avoid this difficulty, it has been found desirable to provide means for disabling the test system 10 during the intervals when there is no panel 12 between the search units 20 and 22. By way of example, a switch 70 may be provided that is responsive to the position of the mounting bracket 44 or the spindle 42. Thus, even though no panel 12 is between the units 20 and 22 and no signal is being received, the system 10 is disabled by the switch 70 and there will be no indications of a defect.

When the system 10 is operating in a through transmission mode, it has been found desirable to employ a magnetic shield in one or both of the search units 20 and 22. This will prevent any stray magnetic fields being radiated from the windings in one search unit to the windings in the other search unit. If the core member 66 is a ferrite, it will prevent or greatly reduce the amount of stray magnetic field. However, in order to further reduce interference from such stray fields, it has been found desirable to also provide netic and conetic cylinders 72 and 74 that surround and enclose both of the coils 60 and 62 in the search unit 20 and 22. A pair of end plates 76 and 78 are also to be secured on the ends of drum 40 and/or the outer races of the bearings 56 so as to rotate therewith. The radially inner ends of the plates 76 and 78 slide on and rotate relative to the inner race of the bearings 56. As a consequence, the cylinders 72 and 74 and plates 76 and 78 shield the coils 60 and 62 and a signal cannot be coupled directly from either of the search units into the other search unit.

If it is desired to operate the test system 10 in a pulse-echo mode, the switch 28 may be set to couple the transmitter 30 and receiver 32 to one of the search units. The transmitter 30 will then periodically energize the transducer 26 and short pulses of ultrasonic energy will be coupled into the workpiece or test panel 12 and reflected from any defects inside of the workpiece and/or the rear surface thereof. The reflected energy will be received by the same search unit and cause the receiver 32 to produce a corresponding signal. The time between the transmitted and received signals will be effective to indicate the distance from the front face to the end of the properly laminated material. As a result, the signal may be used to actuate the readout means to indicate the thickness and/or integrity of the panel.

The foregoing embodiment is very effective to ultrasonically inspect workpieces such as a plywood panel for internal defects. However, as an alternative, it has been found that under some circumstances it may be desirable for the inspection system 10 to employ a search unit similar to the search unit 90 in FIGURE 3. This search unit 90 is similar to the preceding search unit 20 in that it also includes a substantially cylindrical transducer 26 rotatably mounted on a stationary spindle 42. The transducer 26 includes a first electrode 54 on the inner surface and a second electrode 52 on the outer surface. Also, a resilient tire member 58 is mounted on the outside of the transducer 26 for rolling across the surface of the workpiece 12.

The electrodes 52 and 54 are coupled to the transmitting and/or receiving means by a suitable coupling means. However, instead of an inductive reactance as in the first embodiment, a capacitive reactance is employed. The capacitive reactance includes a ground electrode 92 that is mounted on the spindle 42. This electrode 92 has a cylindrical surface which is effective to act as one plate of a capacitor. It should be noted that this electrode 92 is stationary and does not rotate.

A second electrode 94 is mounted on a radial support 96 adjacent one end of the search unit 90. This electrode 94 is also stationary and has a cylindrical surface that is closely spaced to the electrode 54 on the inside of the transducer 26. It may be seen that these two electrodes 54 and 94 will act as plates of a capacitor.

An additional electrode 98 is mounted on the end support 100 adjacent the second end of the search unit. This electrode 98 rotates with the transducer 26 and is electrically connected to the electrode 52 on the outside of the transducer 26. This electrode 98 also has a cylindrical surface which is closely spaced to the stationary electrode 92. As a result, these two electrodes 92 and 98 will also form a capacitor.

The foregoing arrangement forms an electrical circuit similar to that shown in FIGURE 7. It may be seen that electrical signals can be coupled between the stationary electrodes 92 and 94 and the rotating electrodes 54 and 98. Thus, the electrical signals may be coupled to and from the transducer 26 by means of the capacity between the two plates without any sliding contacts, etc.

In the preceding embodiments, the search units have been supported by the bracket 44 and biased into position by springs 46. However, under some circumstances it may be desirable to provide guide means to protect the transducer 26 from impact and shocks as the leading edge of a panel 12 reaches the search unit 20. The guide prepositions the search unit 20 just before it begins scanning the plywood panel 12 so that the tire member 58 is aligned with the surface 102. In the embodiment of FIGURE 4, the guide 104 includes a roller 106 that is mounted on the end of a pivoted arm 108. The roller 106 is positioned to engage the panel 12 and roll on its surface 102 prior to the time that it reaches the search units 20 or 90. The arm 108 is interconnected with a hydraulic control 110 which is, in turn, coupled to a second hydraulic control by a fluid conduit 114. The second control 111 includes a piston 112 that carries the search unit. Whenever a panel 12 begins to travel past the guide 104, the search unit will be raised into a position whereby the tire member 58 will roll across the surface 102 with the correct amount of pressure.

In the embodiment of FIGURE 5, the transducer is rotatably mounted on the end of a pivoting arm 116. A guide roller 118 is mounted on the arm 116 so as to engage the end of the panel 12 as it travels therepast. This will also be effective to position the transducer properly with respect to the panel 12.

The transducer and wear receiving member in the foregoing embodiments have been described as being "substantially cylindrical." Although a cylinder of uniform diameter has been shown, it should be borne in mind that other cylindrical surfaces may be employed. For example, in the embodiment shown in FIGURE 6, the transducer and/or wear receiving members have cylindrical shapes that are curved to conform to the surfaces 119 and 120 on the workpiece 122. An arrangement of this nature may be employed where it is desired to inspect a cylindrical structure such as a tank, etc.

While only a limited number of embodiments of the present invention are disclosed herein, it will be readily apparent to persons skilled in the art that numerous changes and modifications may be made thereto without departing from the spirit of the invention. Accordingly, the foregoing drawings and description thereof are for illustrative purposes only and do not in any way limit the scope of the invention which is defined only by the claims which follow.

What is claimed is:

1. An ultrasonic inspection system for ultrasonically inspecting a series of similar workpieces traveling along a predetermined path and having a pair of oppositely disposed surfaces said system including:
   a pair of search units adapted to be disposed on the opposite sides of the workpiece,
   a substantially cylindrical transducer rotatably mounted in each of said search units,
   a rotating winding in each unit and carried with the transducer therein,
   a stationary winding in each unit inductively coupled to the rotating winding therein,
   inductive decoupling means to decouple the windings in one search unit from the windings in the other search unit, including shield means in each of said search units surrounding the stationary and rotating windings therein,
   means on each of said transducers for rolling across the surfaces of the workpiece and acoustically coupling the transducer to the workpiece,
   transmitting means coupled to the stationary winding in one of said search units, and
   receiving means coupled to the stationary winding in the other of said search units.

2. An ultrasonic wheel search unit for use in ultrasonically inspecting a workpiece by transmitting ultrasonic energy into said workpiece, said wheel search unit including the combination of:
   a stationary transformer core,
   a second transformer core rotatably disposed about the first core and magnetically coupled thereto,
   a first winding on said stationary core member,
   a second winding on the rotating core and inductively coupled to the first winding,
   a transducer rotatable with the second winding, said transducer being electrically coupled to said second winding,
   a resilient member disposed around the transducer for rolling across the workpiece and acoustically coupling the transducer to the workpiece, and
   magnetic shield means surrounding the transformer cores and windings.

3. An ultrasonic wheel search unit for use in ultrasonically inspecting a workpiece by transmitting ultrasonic energy into said workpiece, said wheel search unit including the combination of:
   mounting means,
   a stationary member of magnetic material on said mounting means forming a transformer core,
   a first transformer winding on said stationary member and magnetically coupled to said core,
   a second member of magnetic material rotatably carried by the mounting means, said second member being disposed about the stationary member and magnetically coupled thereto,
   a second transformer winding mounted on said second member to rotate therewith, said second winding being inductively coupled to the first winding,
   a substantially cylindrical transducer mounted on said second member to rotate therewith,
   electrode means on said transducer and electrically coupled to said second winding and energized thereby, and
   a member disposed around the transducer for rolling across the workpiece, said member being transparent to ultrasonic energy and effective to acoustically couple the transducer to the workpiece.

4. An ultrasonic wheel search unit for use in ultrasonically inspecting a workpiece by transmitting ultrasonic energy into said workpiece, said wheel search unit including the combination of:
   mounting means,
   a stationary member of magnetic material on said mounting means, said member forming a transformer core,
   a first transformer winding on said stationary member and magnetically coupled thereto,
   a substantially cylindrical transducer rotatably carried on said mounting means,
   a rotating member carried with said transducer, said second member forming a second transformer core magnetically coupled to the first core, and
   a second transformer winding carried with said transducer to rotate therewith, said second winding being inductively coupled to the stationary core and the first winding thereon and electrically connected to the transducer.

5. An ultrasonic wheel search unit for use in ultrasonically inspecting a workpiece by transmitting ultrasonic energy into said workpiece, said wheel search unit including the combination of:
   an ultrasonic transducer having a substantially cylindrical surface thereon,
   electrode means on said transducer and coupled thereto, said transducer being responsive to ultrasonic energy incident upon the cylindrical surface and effective to produce an equivalent electrical signal,
   mounting means rotatably supporting said transducer,
   means on said transducer for engaging said workpiece and acoustically coupling said transducer to said workpiece,
   a first winding on said transducer for rotating therewith, said winding being electrically connected to the electrode means for receiving said equivalent signal, and
   a second winding carried by the mounting means so as to remain in a fixed position, said second winding being inductively coupled to the first winding,
   magnet shielding means surrounding said first winding, containing the magnetic field from said first and second windings and enabling inductive coupling only between said first and second windings.

6. An ultrasonic wheel search unit for using in ultrasonically inspecting a workpiece by transmitting ultrasonic energy into said workpiece, said wheel search unit including the combination of:
- a substantially cylindrical transducer member having a substantially cylindrical active surface thereon,
- means for rotatably mounting said transducer member adjacent to the workpiece for rotation about the axis of said surface,
- first and second electrode means on said transducer member for energizing the transducer member,
- capacitor means comprisind a grounded cylindrical stationary plate capacitively coupled to a first concentric cylindrical rotating plate connected to said first electrode means, and a concentric cylindric stationary plate capacitively coupled to said second electrode means and adapted to be connected to ultrasonic circuit means;
- a member on said cylindrical surface for rolling on the workpiece, said member being effective to acoustically couple the transducer to the workpiece.

7. An ultrasonic inspection system for ultrasonically inspecting laminated plywood panels having a plurality of wooden laminations bonded together by a bonding matrial and having pairs of oppositely disposed surfaces including the exposed grain of the wooden laminations, said system including:
- a conveyor for carrying a series of successive individual plywood panels therealong at spaced intervals,
- a pair of search units mounted adjacent said conveyor and positioned on the opposite sides of a panel carried by the conveyor,
- a transducer mounted in each of said search units and having an active surface, one of said active surfaces being effective to radiate ultrasonic energy in response to an electrical driving signal, the other of said transducers being effective to receive ultrasonic energy radiated from the other search unit after said energy has propagated through the panel and become incident upon its active surface,
- a coupling tire on each of said search units for contacting and rolling across said surfaces on said panels, said coupling tires being transparent to ultrasonic energy and sufficiently resilient and deformable to follow the exposed grain and intimately acoustically engage the surface to thereby acoustically couple the transducer to the plywood panels,
- transmitting means coupled to the transducer in one search unit for providing an electrical driving signal for exciting the transducer therein and transmitting ultrasonic energy through the laminations and the bonding material within the panel,
- receiving means coupled to the transducer in the other search unit for receiving the equivalent electrical signal produced by the ultrasonic energy transmitted through the panel, said receiving means being effective to produce an indication of the quality of said bonding in response to the presence or absence of said signal, and
- means coupled to said inspection system responsive to the presence of a panel between said search units and effective to disable said inspection system during intervals when a panel is not aligned with the search unit whereby there is no indication of an unacceptable bonding by absence of received signal due to absence of a panel.

8. The ultrasonic inspection system of claim 7 including:
- means coupled to the receiving means and responsive to the equivalent electrical signal, said means being effective to indicate a lack of bonding between the lamination when there is no equivalent electrical signal supplied to the receiving means.

9. The ultrasonic inspection system of claim 7 wherein:
- the transducers in each of the search units and the active surfaces thereon are cylindrical,
- the tire in the coupling member is mounted on the active surface of the transducer and has a cylindrical wear receiving surface for rolling along the surface of the plywood panel, and
- means for rotatably mounting the transducers and tire for revolving around the axes of said cylinders as the tire rolls across the plywood panel.

10. The ultrasonic inspection system of claim 7 including:
- means responsive to the movement of the panels along said conveyor and their passing between the search unit, said means being effective to extend the search units into an inspection position when a leading end of a panel passes between the search units whereby the coupling members engage the surface of the panel and to retract the search units out of the inspection position when the trailing end of the panel passes between the search unit.

11. The ultrasonic inspection system of claim 10 wherein:
- said means includes a fluid actuated piston and cylinder for forcing the search unit into the inspection position and maintaining the tire in intimate contact with the surface of the panel.

References Cited

UNITED STATES PATENTS

| | | | |
|---|---|---|---|
| 2,532,781 | 12/1950 | Petersen | 73—70.1 |
| 3,062,041 | 11/1962 | Spodnewski | 73—71.6 |
| 3,074,267 | 1/1963 | Martin | 73—67.5 |
| 3,130,577 | 4/1964 | Cowan | 73—67.5 |
| 3,315,520 | 4/1967 | Carnevale et al. | 73—67.5 |
| 3,327,523 | 6/1967 | Kelemencky et al. | 73—71.5 |

RICHARD C. QUEISSER, *Primary Examiner.*

JOHN P. BEAUCHAMP, *Assistant Examiner.*

U.S. Cl. X.R.

73—71.5; 310—8.7